E. L. LIDKE.
APPARATUS FOR CUTTING THREADS ON PIPES, &c.
APPLICATION FILED FEB. 1, 1907.

903,209.

Patented Nov. 10, 1908.

2 SHEETS—SHEET 1.

WITNESSES:
D. C. Walter
Cornell Schreiber

INVENTOR
Edward L. Lidke,
By Owen & Owen
His attorneys

E. L. LIDKE.
APPARATUS FOR CUTTING THREADS ON PIPES, &c.
APPLICATION FILED FEB. 1, 1907.
903,209.
Patented Nov. 10, 1908.
2 SHEETS—SHEET 2.
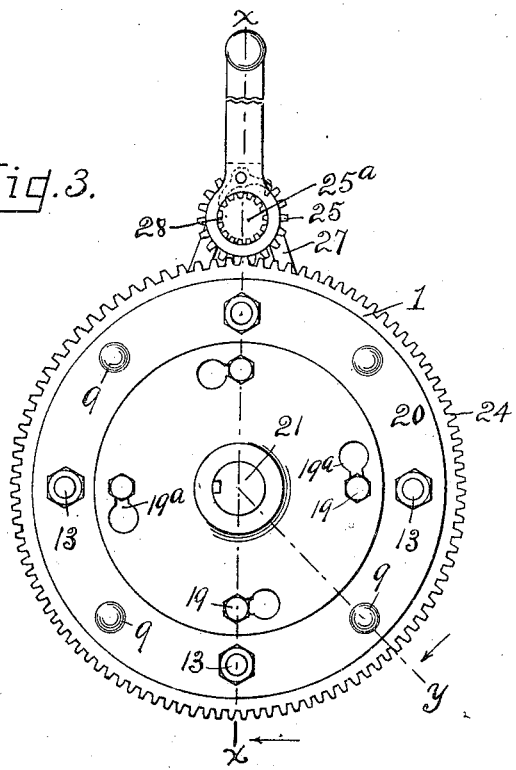
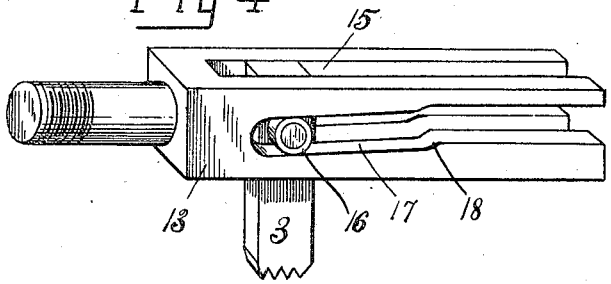
WITNESSES:
D. C. Walter
Lowell Schreiber
INVENTOR.
Edward L. Lidke
By Owen & Owen
his attorneys.

UNITED STATES PATENT OFFICE.

EDWARD L. LIDKE, OF TOLEDO, OHIO.

APPARATUS FOR CUTTING THREADS ON PIPES, &c.

No. 903,209.

Specification of Letters Patent.

Patented Nov. 10, 1908.

Application filed February 1, 1907. Serial No. 355,273.

*To all whom it may concern:*

Be it known that I, EDWARD L. LIDKE, a citizen of the United States, and a resident of Toledo, in the county of Lucas and State of Ohio, have invented a certain new and useful Apparatus for Cutting Threads on Pipes, &c.; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.
This invention relates to that class of mechanical appliances for use in cutting screw-threads on metallic pipe or other cylindrical objects, and more particularly to that class of apparatus which has a guide part clamped to the work and a head movable relative thereto and carrying a series of dies or chasers for cutting the thread.

The primary object of the invention is to provide an improved and highly-efficient device of this class which is capable of cutting either taper or straight threads, and in which the dies or chasers, when a predetermined length of taper thread has been cut, are automatically thrown to inoperative position to permit a removal of the device from the work without back turning.

A further object of my invention is to provide an apparatus for cutting taper threads which has die moving means coöperating with the end of the object being threaded, whereby a longitudinal movement of the object relative to the die carrying head imparts the requisite radial movement to the dies.
Further objects of the invention will be apparent by reference to the following specification, and to the accompanying drawings, in which,—

Figure 1:
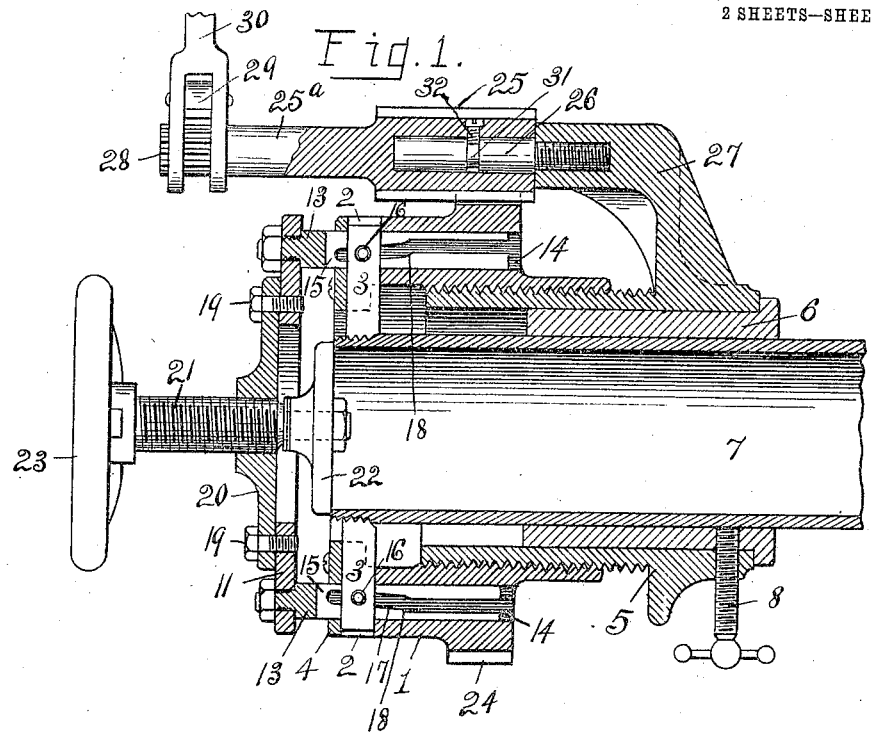
Figure 2:
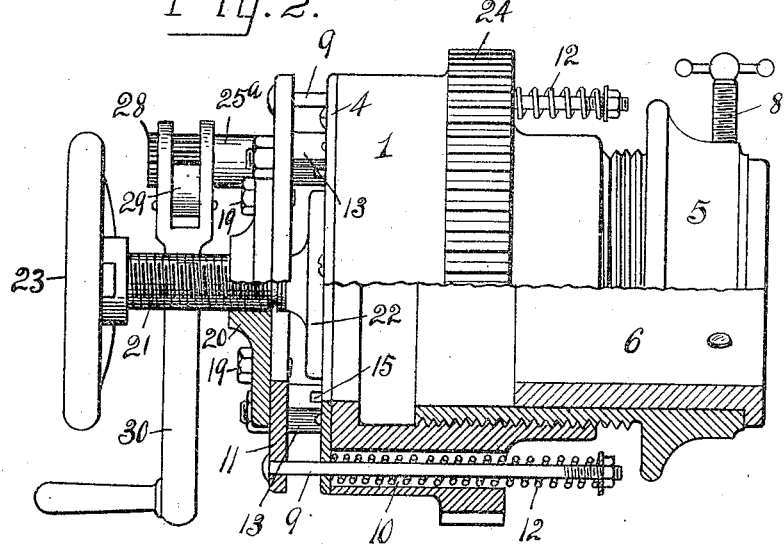

Figure 1 is a central longitudinal section of a thread-cutting apparatus embodying the features of my invention, taken on the dotted lines *x—x* in Fig. 3, the same being operatively associated with a pipe. Fig. 2 is a side elevation of the apparatus in partial section on the dotted line *y* in Fig. 3, with the runway bars and their carrying part partly extended relative to the head. Fig. 3 is a top plan view of the same with the adjusting hand-wheel removed, and Fig. 4 is a perspective view of one of the runway bars and its associated die or chaser.

Referring to the drawings, 1 designates a cylindrical die-carrying head, which is formed on its outer face with a series of radial grooves or die-ways 2 in which the dies or chasers 3 have a free radially-sliding movement, the outer sides of said grooves or ways being closed by a flat ring 4, which is secured to the head end.

Threaded interiorly to the inner end of the head 1 is a guide 5, which is provided with a removable bushing or supplemental guide 6, and is secured to the pipe or other work 7 by one or more hand-screws 8, passing radially into the guide and bushing so that their inner ends will contact with the work. It is apparent that the bushing or supplemental guide 6 is of a size adapted to suit the diameter of the work.

Secured to the outer end of the head 1 by a series of bolts 9 extending loosely through holes 10 in the ring 4 and head-casing is a follower-ring 11, which is normally retained in abutment with the head by the action of the coiled compression springs 12, which are carried by the bolts and coöperate with them and the ring 4 as shown in Fig. 2. Rigidly secured to the follower-ring 11 and projecting inwardly therefrom are a series of runway bars 13 which correspond in number to the number of dies or chasers 3 employed and have their ends projecting within suitable holes 14 in the head 1, said holes coinciding with the grooves or die-ways 2 and being of greater width than said die-ways. Each bar 13 is longitudinally slotted from its inner end for a considerable portion of its length, as at 15, to enable it to straddle the associated die or chaser 3, and has its legs each provided with runways extending lengthwise thereof and in which rollers 16, carried on each side of the die, operate. The inner ends of these runways are tapered for a considerable portion of their length, as at 17, to conform to the taper to be given the thread, and are abruptly angled outwardly relative to the head, as at a point 18 therein, to throw the inner die ends clear of the work as the rollers 16 follow the angled courses of the runways. From the points 18 to the ends of the bars the runways continue in a straight course to permit the bars to be drawn from the head and from engagement with the rollers 16 so that the dies or chasers may be removed for the purpose of substitution or repair.

Secured to the outer face of the follower-ring 11 by screws 19 and closing the opening therein is a follower-plate 20, which is centrally bored and threaded to receive the screw 21, which carries at its lower end the thrust-plate 22 and at its upper end the hand-wheel 23 by means of which it is turned. The plate 22 is capable of turning freely on the screw end and is of suitable size to coact with the end of the work 7, as shown in Fig. 1, so that the follower members and attached bars 13 maintain a fixed position relative to the work as the head 1 is turned upon its guide 5 in the threading operation. As the head recedes from the follower-ring 11, the dies or chasers 3 are caused to have a gradual uniform receding movement from the work for the purpose of cutting the thread on a slight taper, due to the rollers 16 carried thereby traveling in the tapered portions 17 of the runways in the bars 13.

Should it be desired to cut a straight thread the device can be easily converted for that purpose by simply removing the follower-plate 20 with its attached screw 21 and thrust-plate 22 so as to permit the follower-ring and attached runway bars 13 actuated by the springs 12, to remain stationary relative to the head due to the work end passing freely through the follower-ring opening. To facilitate the removal of the follower-plate it is provided with slots 19<sup>a</sup> for receiving the securing screws 19, one end of each of which slots is enlarged sufficiently to permit the screw head to pass therethrough, as shown in Fig. 3, thus enabling the plate to be turned slightly upon a loosening of the screws and then withdrawn from the attached ring.

While it is apparent that numerous methods can be employed for manually driving the head 1, that shown in the drawings, which is particularly designed for heavy work, consists in forming the periphery of the head, as at 24, with an annular rack or series of gear teeth with which the teeth of a pinion 25 mesh. This pinion is sufficiently elongated to allow for the maximum movement of the head relative to its guide during the thread cutting operation, and is revolubly carried by a stud or spindle 26, which is threaded to the angled boss 27 projecting from the side of the guide, as shown in Fig. 1. The pinion 25 has its outer end formed with an axial stem or integral shaft 25<sup>a</sup> which terminates at its free end in a ratchet-wheel 28 with which a pawl 29 carried by an operating handle 30 coacts. The stud or spindle 26 is provided with a peripheral groove 31 with which the inner end of a set screw 32 in the pinion 25 coacts to prevent a withdrawal of the pinion.

To thread a pipe or other object it is passed into the guide until it comes in contact with the contiguous sides of the dies or chasers 3 and is then secured against movement relative to the guide by the hand-screws 8. At this point the work is also intended to contact with the thrust-plate 22 when adjusted to permit the maximum length thread allowed by the tapered runway 17 to be cut. As the die-head and chasers move longitudinally of the work in forming the thread, the chasers are caused to move radially outward in accord with the incline or taper of the portion 17 of the runways in the bars 13, due to said bars being maintained in fixed relation to the work by the contact of the thrust-plate therewith. As the angled portions 18 of the runways move past the die-rollers 16 the dies or chasers are thrown abruptly outward thereby sufficient to free them from engagement with the work, thus permitting a removal of the device from the work, after the screws 8 have been loosened, without necessitating a backturning of the head, it being understood, of course, that the die-head and follower parts must be held distended against the action of the closing-springs 12 during such removal in order to prevent the die-rollers from reëntering the portions 17 of runways and effecting a consequent reëngagement of the dies with the work.

Should it be desired to cut a thread of less length than the length of the tapered portions 17 of the runways and at the same time release the dies from the work at the end of such cut, the screw 21 is turned in the proper direction to force the follower-parts outward from the die-head until the distance between the die-rollers 16 and the angled points 18 in the runways is equal to the length of thread desired, thus enabling the device to be set to release the dies from the work at the end of any predetermined length of thread. To remove the dies from the die-head it is only necessary to remove the nuts from the ends of the bolts 9, after which the bars 13 and attached follower-parts can be withdrawn from the head and the dies then drawn radially from their pockets.

Having thus described my invention, what I claim as new, and desire to secure by Letters Patent, is,—

1. In combination, a die-head, a guide threaded thereto, radially-movable chasers mounted in the die-head, longitudinally movable bifurcated bars mounted in the die-head and freely straddling the chasers, said bars having tapered runways, rollers carried by the chasers and operating in the runways for effecting positive radial movements of the chasers in either direction when the bars are moved relative to the head, and means for maintaining the bars longitudinally stationary relative to the guide when the die-head and guide have relative longitudinal movement.

2. In combination, a die-head, a guide threaded thereto, radially movable chasers mounted in the die-head and having laterally projecting guide parts, bars longitudinally movable in the die-head and having longitudinal intersecting slots one of which receives the chasers, the other being tapered and forming runways for the guide-parts of the chasers whereby a positive receding movement is imparted to the chasers when the bars are moved in one direction, and means for maintaining the bars longitudinally stationary relative to the guide when the die-head and guide have relative longitudinal movement.

3. In combination, a die-head, a guide threaded thereto, radially movable chasers mounted in the die-head and having laterally projecting guide-parts, bars mounted in the die-head and movable at right-angles to the movement of the chasers, said bars having tapered grooves which receive and form runways for the guide-parts of the chasers, a ring in advance of the die-head carrying said bars, members carried by the ring and projecting through the head, compression-springs mounted on said members and coöperating therewith and with the head to normally retain the head and ring in contracted relation, and means carried by the ring and coöperating with the work to move the ring and bars relative to the head when the latter is turned.

In testimony whereof I have hereunto signed my name to this specification in the presence of two subscribing witnesses.

EDWARD L. LIDKE.

Witnesses:
 H. W. BLECKLEY,
 FRANK H. GEER.